Dec. 1, 1959   F. O. RINGLEB   2,915,136
APPARATUS FOR SUPPRESSING NOISE
Filed May 28, 1956   3 Sheets-Sheet 1
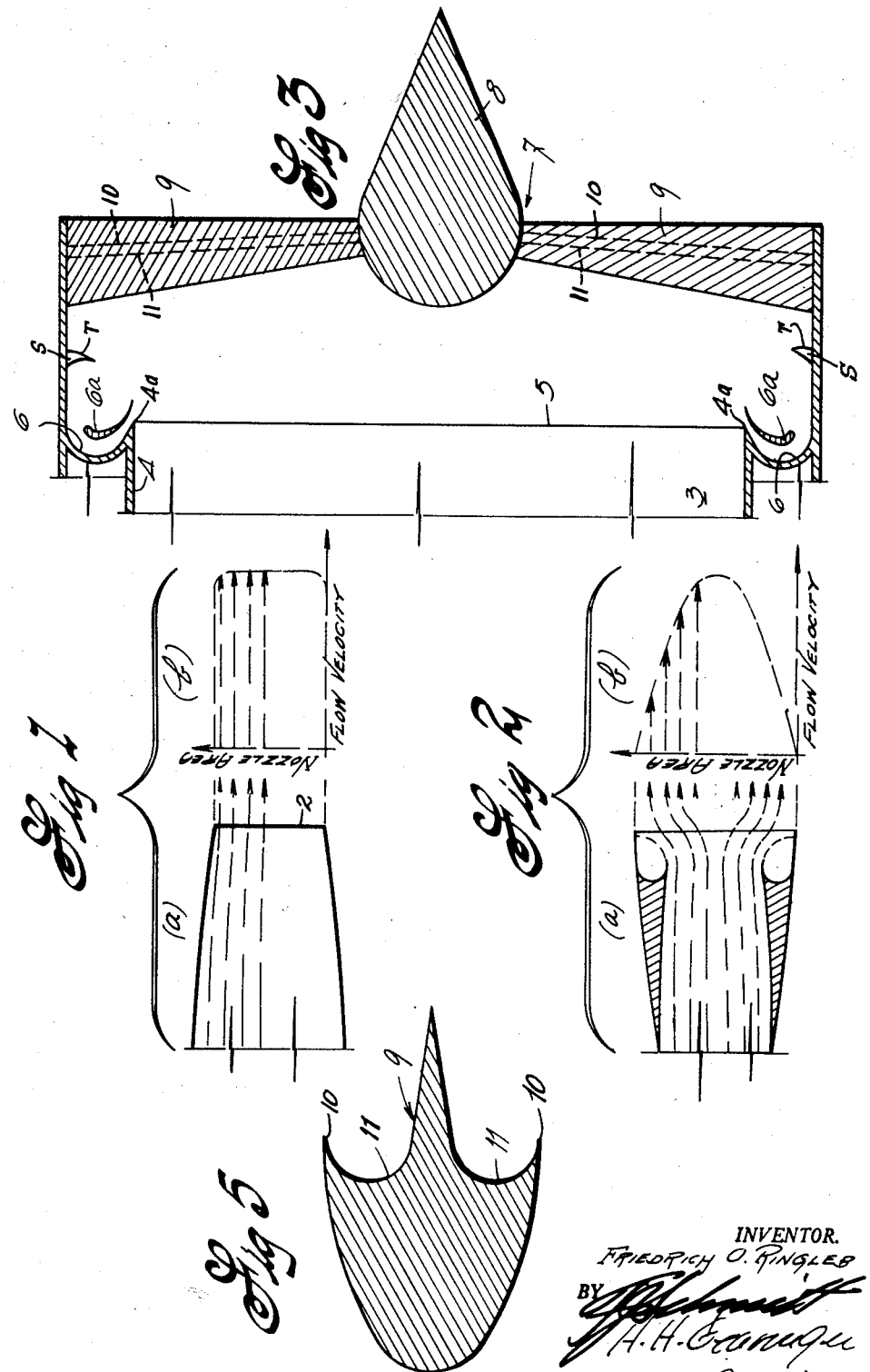

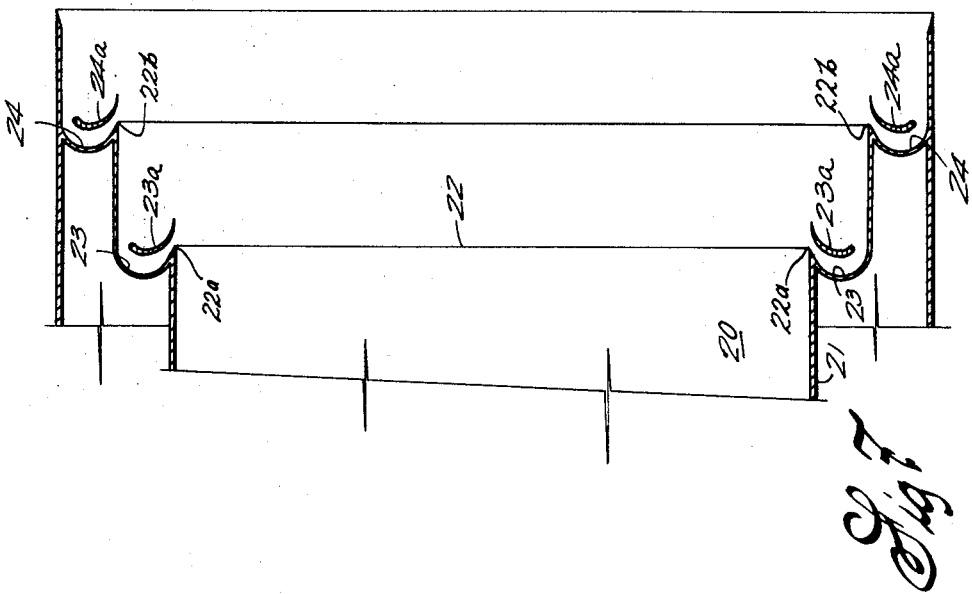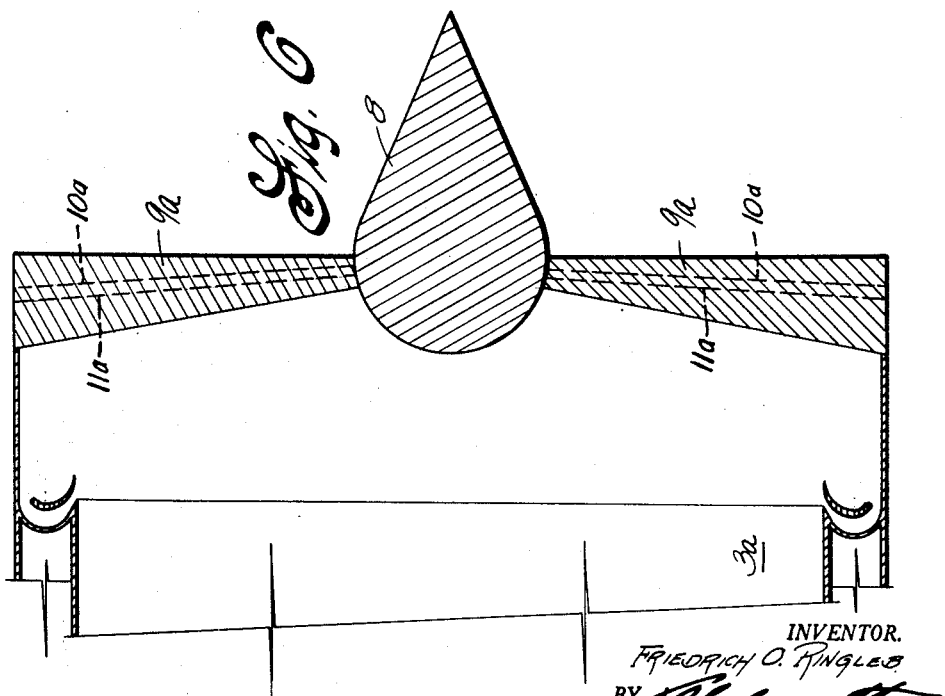

INVENTOR.
FRIEDRICH O. RINGLEB

United States Patent Office 2,915,136
Patented Dec. 1, 1959

2,915,136

APPARATUS FOR SUPPRESSING NOISE

Friedrich O. Ringleb, Woodbury Heights, N.J.

Application May 28, 1956, Serial No. 587,911

2 Claims. (Cl. 181—57)

(Granted under Title 35, U.S. Code (1952), sec. 266)

This patent application is a continuation-in-part of a copending application entitled "Suction-Vortex Flap," Serial No. 419,945, filed by Friedrich O. Ringleb on March 30, 1954, now abandoned.

The invention described herein may be manufactured and used by or for the Government of the United States of America for governmental purposes without the payment of any royalties thereon or therefor.

The present invention relates to the control of the flow of a fluid through a structural conduit or the like and more particularly to novel and improved methods and apparatus for suppressing and minimizing the noise level of jet propulsion apparatus.

With the demand for continued increases in the thrust and speed of the various types of jet engines and power plants in the field of aeronautics, the problem of the relatively high level noise characteristics of the same has become increasingly important. Although various attempts have been made in the past to minimize the noise produced by the jet powered aircraft, considerable difficulty has been experienced heretofore in providing effective noise reduction without simultaneous undue loss in thrust of the propulsion system.

Accordingly, it is a principal object of the present invention to provide novel and improved noise suppressing apparatus for a jet-type engine or power plant.

It is a further object of the present invention to provide novel and improved noise suppression apparatus for a jet aircraft engine or the like wherein no substantial loss of thrust energy occurs.

Other objects and many of the attendant advantages of this invention will be readily appreciated as the same becomes better understood by reference to the following detailed description when considered in connection with the accompanying drawings wherein:

Figure 1 is a diagrammatic view of a conventional fluid discharge nozzle together with a velocity distribution flow diagram at the nozzle exit thereof.

Figure 2 is a diagrammatic view of a fluid discharge nozzle which is improved in accordance with the present invention together with its nozzle exit velocity distribution flow diagram.

Figure 3 is a cross sectional view of an embodiment of the present invention.

Figure 5 is a cross sectional view along reference line 5—5 in Figure 4.

Figure 6 is a cross sectional view of another embodiment of the present invention.

Figure 7 is a cross sectional view of still another embodiment of the present invention.

Figure 4:
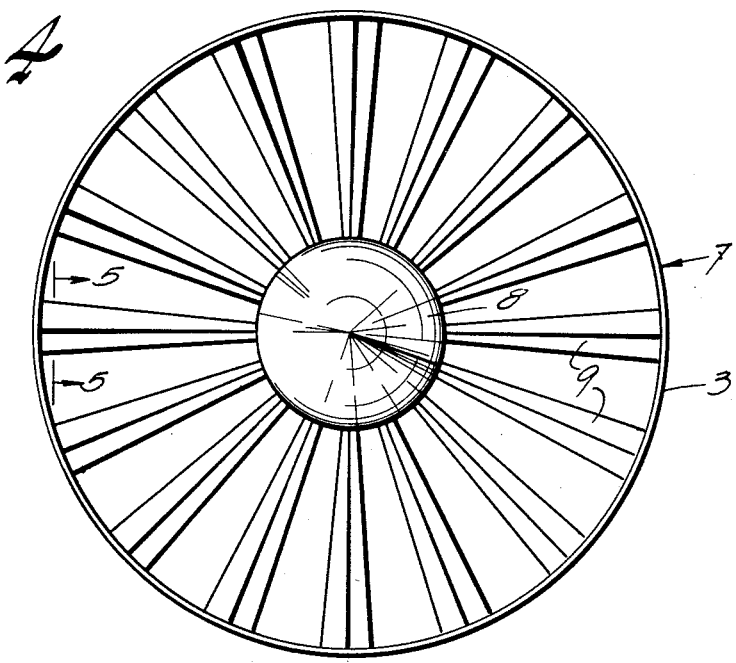
Figure 4 is a right end view of the embodiment shown in Figure 3.

Referring first to Figure 1 of the drawing, it is to be noted that the velocity of fluid flow through the conventional jet nozzle 2 is substantially uniform over the entire discharge area. This flow from the conventional nozzle, it has been found, produces excessive turbulence and noise due to the high shear effect between the relatively slow moving fluid of the surrounding atmosphere and the rapidly moving gases at the peripheral boundary of the jet exhaust stream. Accordingly, the primary purpose of the present invention is to reduce this noise producing shear effect by providing a nozzle which develops a fluid velocity distribution curve such as that shown in Figure 2 wherein peripheral gases of the fluid exhaust stream flow at a reduced velocity and minimize the undesired shear effect while gases toward the center of the stream flow at an increased velocity such that the average fluid velocity over the entire exhaust area and the overall thrust of the jet is not appreciably diminished. As will be disclosed more fully hereinafter this is accomplished by providing the nozzle with a cusp-shaped diffusing surface which guides the fluid flow over a standing vortex and/or with a spoke-shaped fluid conducting device which subdivides the effective fluid discharge area into a plurality of wedge-shaped sectors.

A first embodiment of the present invention is illustrated in Figures 3–5 of the drawing. As shown therein, the after section of the fluid discharge tube or tailpipe 3 converges inwardly at 4 to define a predetermined nozzle area or orifice 5. Fluid flow aft of the orifice 5 is then influenced and controlled by the annular cusp 4a and cavity 6 which is designed in a manner described more fully hereinafter such that a fluid vortex is formed and stabilized or held in equilibrium immediately downstream. The annular vane-like elements 6a which are designed to follow the streamlines of the vortex are preferably positioned as shown within the cavity 6 in any suitable manner such as by means of conventional strut members or the like. As will be more apparent hereinafter these vane-like elements being disposed adjacent the origin of the cusp creates a suction force which helps to stabilize the vortex formed within the cavity 6.

The spoke-shaped device or the like 7 which is disposed within the fluid discharge tube 3 aft of the nozzle area or orifice 5 and downstream from the cusp 4a and the cavity 6 preferably includes an axially disposed streamlined hub portion 8 and a plurality of radial elements or spokes 9 which extend outwardly from the hub portion to the peripheral extremity of the tailpipe 3. As shown in Figure 5 of the drawing in cross section each of the spokes 9 has a rounded leading edge and a pair of cusps 10 and cavities 11 which guide the fluid flow about the elements 9 and minimize fluid turbulence aft thereof.

In operation fluid directed through the orifice 5 of the tailpipe 3 produces a fluid vortex within the cavity 6 which decreases the flow velocity of the fluid adjacent the cylindrical wall of the tailpipe 3 and increases its velocity toward its center. This ultimately reduces the shear effect of the fluid discharged from the tailpipe upon the relatively slow moving surrounding atmosphere and at the same time by increasing fluid velocity toward the tube center prevents any substantial reduction in thrust. As the fluid then passes through the sector-shaped interstices of the device 7, the velocity of the fluid toward the center of the tailpipe is again accelerated substantially more than the fluid adjacent the outer wall of the tailpipe due to the decreased cross-sectional area of the sector-shaped interstices adjacent the hub portion 8 of the device 7. Thus, it is seen that the annular cusp 4a together with the cavity 6 and the device 7 effectively decrease the flow velocity of fluid within the tailpipe adjacent its peripheral wall and increase the flow velocity of fluid through the center of the tailpipe, thereby reducing the turbulence and noise of the system without a substantial reduction in thrust.

A second embodiment of the invention is illustrated in Figure 6 of the drawing. This embodiment of the invention is similar in construction and design to the above described embodiment except that the outer extremities of the radial elements or spokes 9a are open rather than closed by the trailing edge of the tailpipe 3a. It has been found that by leaving the spokes 9a open, fluid or air from the surrounding atmosphere is drawn inwardly and radially through the cavities 11a thereby better stabilizing the vortices formed therewithin.

A third embodiment of the present invention is disclosed in Figure 7 of the drawing. As shown therein, the after section of the fluid discharge tube or tailpipe 20 converges inwardly at 21 to define a predesigned nozzle area or orifice 22. Fluid flow aft of the orifice 22 is influenced and controlled by a series of annular cusps 22a and 22b and cavities 23 and 24. More specifically each of the cavities is designed such that a fluid vortex is formed and stabilized or held in equilibrium in each. The annular vane-like elements 23a and 24a are designed as described above in the embodiment of Figures 3–5 to follow the streamlines of the vortex in the cavities 23 and 24 and are structurally positioned therewithin in any suitable conventional manner. In this way, it has been found that the relative velocity of fluid flow adjacent the cylindrical wall of the tube 20 is decreased, the shear effect of the rapidly moving fluid discharged from the tube upon the relatively slow moving fluid or atmosphere surrounding the tube is reduced, and the resultant fluid turbulence and noise produced by the fluid discharge from the tube is substantially suppressed.

Although the present invention has been shown and described without use of an inner cone in the exhaust-nozzle assembly, it is to be understood that any suitable inner cone which terminates either within or extends beyond the trailing edge of the tailpipe could be provided in any of the above described various embodiments without departing from the spirit or scope of the invention.

It is also to be understood that the actual dimensions and contour characteristics of the above described cavities and cusps are critical but are not limited to any particular cusp. On the contrary practically an infinite number of different contours are suitable for the desired purpose and as will be more apparent hereinafter may be readily designed either experimentally or mathematically.

Experimentally, a suitable cusp and cavity can be designed by constructing a model and measuring the fluid pressure along the surfaces thereof. More specifically, it has been found that desired results may be obtained by varying the angle of the tangent of the cusp point of the model until the presence of the vortex is indicated by the measured pressure distribution. When the vortex in the cusp is thus obtained, it has been found that the velocity of the fluid along the surface increases from a point immediately preceding the cusp point up to the cusp point and that the center of the vortex coincides with a stagnation point in the basic flow pattern. Although not absolutely necessary in the design of the cusp, it might also be noted that for possible further improved results the velocity of the air along the curvilinear surface of the cusp from the stagnation point S (see Figure 9) where the free streamline 6b meets the surface should also be required to increase up to a maximum at the origin 6c of the cusp.

Figure 8:
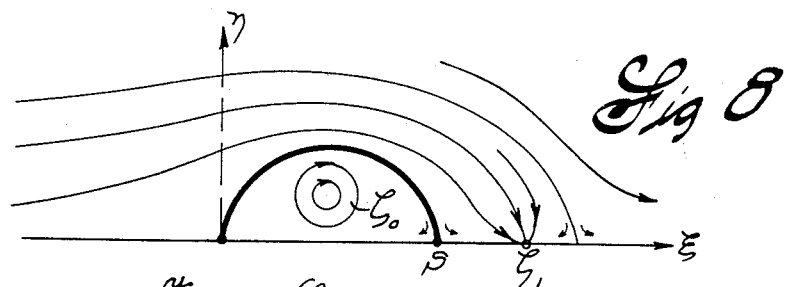
Figure 8 and 9 are diagrams which demonstrate the manner in which a suitable cavity and cusp may be designed mathematically.
Figure 9:
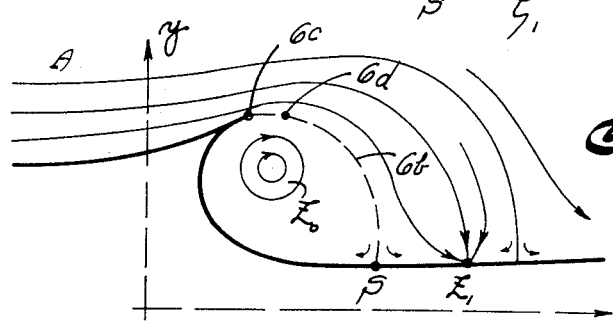

Mathematically, a general design criterion for a suitable cusp can be obtained for two-dimensional flow from classical potential flow considerations. For this purpose $$Z = f(\zeta) \qquad (1)$$

denotes any complex analytical function of the complex variable $\zeta = \xi + i\eta$ which transforms conformally the upper zeta ($\zeta$) half plane (Figure 8) into an era A within the $Z = X + iy$ plane (Figure 9). The area A is the flow area which is to be considered. Any flow within the area A corresponds, due to the conformal transformation, to a flow within the upper zeta half plane.

The flow in the zeta plane can be determined for any given singularities and may be represented by the complex potential function $$X = \phi + i\psi = f(\zeta)$$

where the lines X = constant are the streamlines of the flow. If this flow has a vortex at $\zeta_0$ in the zeta plane that corresponds to a vortex at $Z_0$ in the Z plane, the components X,Y of the force F acting on the vortex $Z_0$ are given by $$Y + ix = -\frac{\rho}{2} \phi r_0 \frac{1}{f'(\zeta)} \left(\frac{dX}{d\zeta}\right)^2 d\zeta \qquad (2)$$

where the integral is computed around the point $\zeta_0$ but no other singularity and where $\rho$ is the density of the fluid. The condition that this force is zero is therefore $$\phi r_0 \frac{1}{f'(\zeta)} \left(\frac{dX}{d\zeta}\right)^2 d\zeta = 0 \qquad (2a)$$

If this condition holds, the vortex is in equilibrium.

The left side of this equation represents in general a complex function of the real coordinates $\xi_0, \eta_0$ of the vortex and yields two real functions of $\xi_0, \eta_0$ each of which must be equal to zero.

If these two equations $L(\xi_0,\eta_0) = 0$ and $M(\xi_0,\eta_0) = 0$ have a real pair of solutions, an equilibrium position of the vortex exists at $\xi_0,\eta_0$. However, a pair of real solutions need not exist. They can be complex or not existing at all and in such case no equilibrium position for the vortex exists for the area A given by $Z = f(\zeta)$ and the flow therein $X = f(\zeta)$. Thus, the Equation (2a) represents the general design criterion for any area with a vortex in an equilibrium position.

Where a structural surface merely involves the formation of a vortex-creating cusp therein and a single suction slot as in my aforesaid copending application, the design considerations of the cusp require the study of a flow which is parallel to the $\xi$ axis in Figure 8 which has a vortex superimposed thereon at $\xi_0$ and a sink at the $\xi$ axis situated at a prescribed point $\zeta_1$. If $\mu_0$ is the velocity of the parallel flow, $\gamma$ the circulation of the vortex and Q the strength of the sink the complex potential function of the flow is $$X = \mu_0 \zeta + \frac{\gamma i}{2\pi} \ln \frac{\zeta - \zeta_0}{\zeta - \bar{\zeta}_0} - \frac{Q}{\pi} \ln(\zeta - \zeta_0) \ldots \qquad (3)$$

where $\bar{\zeta}_0$ is the conjugate complex value of $\zeta_0 = \xi_0 + i\eta_0$.

If $Z = f(\zeta)$ is to transform the upper zeta half plane conformally into an area A with a cusp that originates at a point that corresponds to $\zeta = 0$, the derivative of $f(\zeta)$ at $\zeta = 0$ must be of the first order zero. Thus, $$f'(0) = 0 \qquad (4)$$

The flow in the zeta plane must have now a stagnation point at $\zeta = 0$ in order to obtain a finite velocity at the origin of the cusp. Accordingly, differentiating Equation 3 with respect to $\zeta$ and putting $\zeta = 0$ yields the condition $$C_\gamma = \left(1 + \frac{C_Q}{\zeta_1}\right) \frac{\xi_0^2 + \eta_0^2}{2\eta_0} \qquad (5)$$

where $$C_\gamma = \frac{\gamma}{2\pi\mu_0}, \quad C_Q = \frac{Q}{\pi\mu_0} \qquad (6)$$

Further, the computation of the integral from the general design criterion (2a) which produces a force on the vortex in the plane equal to zero, yields the condition $$\frac{f''(\zeta_0)}{f'(\zeta_0)} = -i\left(\frac{2}{C_\gamma} - \frac{1}{\eta_0} - \frac{2}{\zeta_0 - \zeta_1} \frac{C_Q}{C_\gamma}\right) \qquad (7)$$

In order to obtain a cusped area for which a vortex will exist, one can first select arbitrarily the coordinates $\xi_0, \eta_0$ of the vortex within the upper zeta half plane, the position $\zeta_1$ of the sink and its suction coefficient $C_Q.C_\gamma$ and the ratio $$\frac{f''(\zeta_0)}{f'(\zeta_0)}$$

may then be respectively computed from Equations 5 and 7. By then selecting $Z=f(\zeta)$ such that it satisfies Equation 4 and the values obtained from Equations 5 and 7, the contour of the desired cusp may be determined and plotted.

A solution determined in this way should finally be checked with respect to the required increase in velocity from 4 to 6c (see Figure 3). If there is a velocity maximum between 4 and 6c, the solution must be discarded or is at least of questionable value since in such case the flow will tend to separate before the cusp.

The solution in order to be complete should also be checked further to determine whether the velocity of the flow continues to increase along the free streamline 6b beyond the origin of the cusp. If it is found that there is a velocity maximum along 6b at a point 6d, the solution can be completed by adding the part 6c—6d of the free streamline as a lip to the wall of the cusp.

Experiments have shown that the desirability of increasing the flow velocity along the inside wall of the cavity from S to 6c is not of essential importance but may provide improved results if realized in the solution.

A specific example of the above disclosed solution for a cusp with an existing vortex in equilibrium may be obtained for instance by choosing $$Z=f(\zeta)=\zeta+C_0 ln(\zeta-C_1) \qquad (8)$$

where the constants $C_0$ and $C_1$ have to be determined from the conditions (4), (5), and (7). The Equation 4 yields $$C_1=C_0 \qquad (9)$$

Equation 7 yields $$\frac{C_0}{\zeta_0(\zeta_0-C_0)}=i\left(\frac{2}{C\gamma}-\frac{1}{\eta_0}-\frac{2}{\zeta_0-\zeta_1}\frac{C_Q}{C\gamma}\right) \dots \qquad (10)$$

where $C_\gamma$ has to be replaced by the right side of Equation 5. Thus for a given set of values $\zeta_0=\xi_0+i\eta_0$, $\zeta_1$ and $C_Q$ this equation determines $C_0$. Because this equation is linear in $C_0$ it has always a solution $C_0$ determining the function (8) completely because of (9). However, only such sets of values $\zeta_0$, $\zeta_1$ and $C_Q$ are of practical interest for which $C_0$ represents a point in the lower $\zeta-$ half plane.

If $C_0$ is determined in this way and kept constant changing $C_Q$ afterwards Equation 10 shows that the position $\zeta_0$ of the vortex will move to a position which is different from the position corresponding to the chosen design value of $C_Q$. In accordance with strict theoretical considerations, the vortex obtained by the preceding method though it exists in equilibrium need not be stable necessarily. However, experiments have shown that the vortex is practically always stable if the suction coefficient $C_Q$ is large enough or at least not smaller than its design value.

If no suction is applied, the suction coefficient $C_Q$ being zero, the vortex will be generally unstable according to potential flow theory. Nevertheless stability may exist practically due to the influence of the viscosity of the fluid. In cases of actual instability, however, stability may be enforced by the conventional method of guiding surfaces such as a thin wall T extending from S (Figure 3) along a small part of the free streamline into the flow area. Quite generally stability will be always produced by trapping the vortex, letting a sufficient part of an enclosing streamline freeze.

The general condition (2a) on which the above described design methods are based is applicable to any type of flow with a vortex within a cusp that may be desired. Thus, the same design considerations may be employed where further singularities in the structural surface are present such as more sinks or sources. In computing a suitable cusp for such a case the Equation 3 need only be modified to include the additional singularities; otherwise, the design procedure is unchanged.

Although the present invention has been found particularly useful in connection with the structural surfaces of various types of aircraft or the like including inside surfaces and has therefore been disclosed hereinabove in connection therewith, it is to be understood that it could be also used in any other way wherein separation of the flow from a surface must be minimized and/or avoided without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

1. Apparatus for suppressing the noise level of fluid flow through and out of a conduit comprising means defining an annular cusp in the internal wall of the conduit; and a diffuser device disposed within the conduit adjacent the fluid discharge extremity thereof and including a hub portion substantially alined with the axis of the conduit and a plurality of vane-like elements that extend outwardly and radially from the hub portion to the peripheral wall of the conduit, each of the vane-like elements having rounded leading edges and a pair of opposed cusps adjacent the trailing edge thereof, the contour of each of the said cusps being arranged and designed to form a stabilized fluid vortex therein.

2. The apparatus of claim 1 wherein said vane-like elements are provided with openings on their outer extremities.

References Cited in the file of this patent

UNITED STATES PATENTS

| | | |
|---|---|---|
| Re. 18,534 | Johnson | July 19, 1932 |
| 981,584 | Miller | Jan. 10, 1911 |
| 2,096,260 | Pavillon | Oct. 19, 1937 |
| 2,110,986 | Kadenacy | Mar. 15, 1938 |
| 2,241,729 | McCurdy | May 13, 1941 |
| 2,375,180 | Vigo | May 1, 1945 |
| 2,382,386 | Arms | Aug. 14, 1945 |
| 2,543,461 | Latulippe | Feb. 27, 1951 |
| 2,678,560 | Bonney | May 18, 1954 |
| 2,709,917 | Bruynes | June 7, 1955 |
| 2,725,948 | Keene | Dec. 6, 1955 |

FOREIGN PATENTS

| | | |
|---|---|---|
| 322,283 | Germany | June 25, 1920 |
| 685,301 | France | Mar. 31, 1930 |
| 46,970 | France | Aug. 24, 1936 |
| 834,161 | France | Aug. 8, 1938 |
| 610,623 | Great Britain | Oct. 19, 1948 |

OTHER REFERENCES

"Aviation Week," publication, vol. 59, issue 18, p. 39, November 2, 1953.

UNITED STATES PATENT OFFICE
Certificate of Correction

Patent No. 2,915,136                                                                December 1, 1959

Friedrich O. Ringleb

It is hereby certified that error appears in the printed specification of the above numbered patent requiring correction and that the said Letters Patent should read as corrected below.

Column 4, lines 14 to 16, Equation (2) should appear as shown below instead of as in the patent—

$$Y+ix=\frac{-\rho}{2}\oint \zeta_0 \frac{1}{f'(\zeta)}\left(\frac{dX}{d\zeta}\right)^2 d\zeta$$

same column 4, lines 20 to 22, Equation (2a) should appear as shown below instead of as in the patent—

$$\oint \zeta_0 \frac{1}{f'(\zeta)}\left(\frac{dX}{d\zeta}\right)^2 d\zeta = 0$$

Signed and sealed this 14th day of June 1960.

[SEAL]

Attest:
KARL H. AXLINE,
*Attesting Officer.*

ROBERT C. WATSON,
*Commissioner of Patents.*